Patented Dec. 5, 1944

2,364,349

UNITED STATES PATENT OFFICE 2,364,349

ANTHRAQUINONE COMPOUNDS

Joseph B. Dickey, Rochester, N. Y., assignor to Eastman Kodak Company, Rochester, N. Y., a corporation of New Jersey No Drawing. Application October 7, 1941, Serial No. 414,035

3 Claims. (Cl. 260—373)

This invention relates to new anthraquinone compounds which are useful in the art of dyeing or coloring organic derivatives of cellulose. Coloration can be effected by dyeing, printing, stencilling or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose or benzyl cellulose. While my invention will be illustrated more particularly in connection with the coloration of cellulose acetate, it will be understood that it applies to the coloration of other organic derivatives of cellulose such as those just mentioned.

It is an object of my invention to provide a new class of anthraquinone dyes. Another object is to provide a process for the coloration of organic derivatives of cellulose. A further object is to provide colored organic derivative of cellulose textile materials which possess good fastness properties, such as to light and washing. Other objects hereinafter appear.

The anthraquinone compounds by means of which the above named objects are accomplished or made possible have the formula:

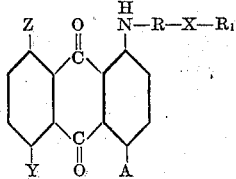

wherein R stands for an aliphatic hydrocarbon radical, X stands for a member selected from the group consisting of

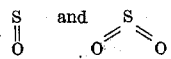

R₁ stands for an aliphatic group, A stands for a member selected from the group consisting of an amino group, a hydroxy group, a

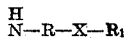

group and a

group, wherein R₂ stands for a member selected from the group consisting of an alkyl group, a hydroxyalkyl group and an alkoxyalkyl group and R, X and R₁ have the meaning above given and Y and Z each represents a member selected from the group consisting of hydrogen, a hydroxy group, an alkoxy group, an amino group, a

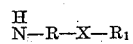

group and a

group, wherein R, R₁, R₂ and X have the meaning above defined.

The anthraquinone compounds of my invention can be prepared by reacting a leuco anthraquinone such as leuco quinizarin, leuco 1-hydroxy-4-aminoanthraquinone, leuco 1,4,5,8-tetra-hydroxyanthraquinone, leuco 1-amino-4-methoxyanthraquinone, leuco 1,4-diaminoanthraquinone, leuco 1,4,5-trihydroxyanthraquinone, leuco 1,4,5-triaminoanthraquinone, leuco 1,5-dihydroxy-4-methylamino anthraquinone and leuco 1,4,5,8-tetraaminoanthraquinone, for example, with an amine having the formula H₂N—R—X—R₁, wherein R, X and R₁ have the meaning previously assigned to them. Such amines are called aliphatic sulfones (where X represents SO₂) and aliphatic sulfoxides (where X represents SO). This reaction may be conducted either with or without an alkylamine, a hydroxyalkylamine or an alkoxyalkylamine being present. Also, if desired, mixtures of leuco and non-leuco anthraquinone compounds can be employed. Where the compound desired contains an alkylamino, a hydroxyalkylamino or an alkoxyalkylamino group, it will be understood that these groups can be introduced simultaneously with the

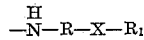

grouping or separately.

The condensation reaction referred to above can be carried out in the presence of a solvent or diluent such as ethanol, butanol, tetrahydrofurfuryl alcohol or pyridine. The leuco dye compounds formed may be oxidized with air, sodium perborate, hydrogen peroxide or other suitable oxidizing agent in known fashion to obtain the desired dye compounds.

While the anthraquinone dye compounds of my invention have been mentioned in connection with their application for the coloration of organic derivatives of cellulose they likewise possess some application for the coloration of wool and silk. If sulfonated, by methods known to the art for introducing sulfonic acid groups, compounds are obtained which color wool and silk but which have little or no utility for the coloration of organic derivatives of cellulose.

Mixtures of dyes appear to be advantageous. Certain of these advantageous dye mixtures are described and claimed hereinafter.

The following examples illustrate the preparation of the anthraquinone dye compounds of my invention:

Example 1

24 grams of leuco quinizarin are dissolved in 200 cc. of butanol and heated to the boiling point together with 15 grams of β-aminoethylmethylsulfone. The leuco dye compound formed is oxidized to its non-leuco form by passing air into the boiling reaction mixture. The dye compound obtained is precipitated by the addition of water, recovered by filtration and dried. The dye which is a mixture of

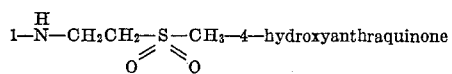

and

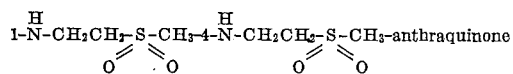

colors cellulose acetate silk purple.

Example 2

25 grams of 1-amino-4-methoxyanthraquinone are dissolved in boiling methanol and 11 grams of β-aminoethylmethylsulfoxide dissolved in methanol are added dropwise to the anthraquinone mixture over a period of one hour. When the reaction which takes place is complete, the dye compound formed is allowed to crystallize out from the reaction mixture following which it may be recovered by filtration and dried. The dye compound obtained

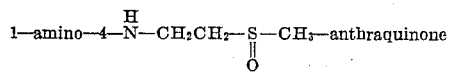

colors cellulose acetate silk reddish-blue shades.

Example 3

33 grams of 1,5-diamino-4,8-dinitroanthraquinone are dissolved in dimethylaniline and heated with 35 grams of β-aminoethyl-β-hydroxyethylsulfone at 100–200° C. until no further color change to the blue-green takes place. Following this, the dimethylaniline is removed by steam distillation and the dye compound formed is recovered by filtration, washed with water and dried.

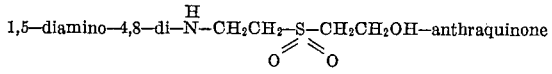

is obtained and colors cellulose acetate silk bluish-green shades.

Example 4

24 grams of leuco quinizarin are dissolved in 200 cc. of pyridine and 25 grams of β-aminoethylmethylsulfone. The mixture resulting is refluxed for four hours following which it is poured into water and the leuco dye formed oxidized to its non-leuco form with alkaline sodium perborate. The dye compound formed is recovered by filtration, washed with water and dried.

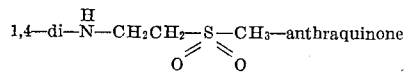

is obtained and colors cellulose acetate silk blue.

Example 5

24 grams of leuco quinizarin, 150 cc. of butanol, 13.8 grams of γ-aminopropylmethylsulfone and 10.8 grams of β-amino-ethylmethylsulfoxide are refluxed together for 4 to 8 hours following which the reaction mixture is worked up in accordance with the procedure described in Example 1.

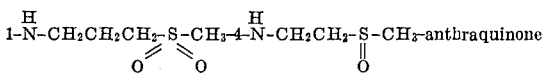

is obtained and colors cellulose acetate silk blue.

Example 6

27 grams of leuco-1,4,5,8-tetrahydroxyanthraquinone are reacted and worked up as described in Example 1 with 7.6 grams of ethanolamine and 19 grams of

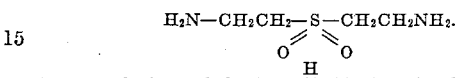

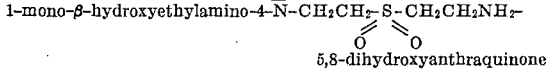

is obtained and colors cellulose acetate silk blue-green.

Example 7

24 grams of leuco-1,4-diaminoanthraquinone are reacted in butanol with 3.6 grams of methylamine and 15 grams of β-aminoethylmethylsulfone in accordance with the procedure described in Example 1. Upon working up the reaction mixture,

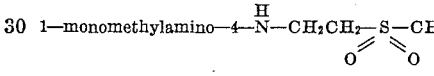

is obtained which colors cellulose acetate silk blue.

Example 8

24 grams of leuco quinizarin, 150 cc. of butanol, 4.4 grams of methylamine and 7.4 grams of β-aminoethylmethylsulfone are refluxed together for four hours following which the resulting leuco dye formed is oxidized by passing air into the hot reaction mixture. Upon working up the reaction mixture, a dye mixture consisting of anthraquinone compounds which are substituted in the 1 and 4 positions with a monomethylamino group and a

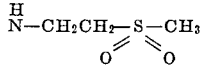

group and in which said groups are present in the ratio of seven moles of the methylamino group to three moles of the

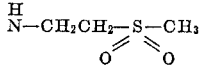

group is obtained. The anthraquinone compounds forming this dye mixture contain no substituents in addition to those named. It colors cellulose acetate silk deep blue shades which are very fast to light.

Example 9

24 grams of leuco quinizarin, 150 cc. of butanol, 8.6 grams of ethanolamine and 7.4 grams of β-aminoethylmethylsulfone are refluxed together for 4 hours following which the leuco dye mixture formed is oxidized in any suitable manner. Upon working up the reaction mixture, a dye mixture consisting of anthraquinone compounds substituted in the 1 and 4 positions with a mono-β-hydroxyethylamino group and a

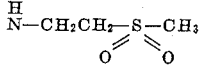

group and in which the said groups are present in the ratio of seven moles of the β-hydroxyethylamino group to three moles of the

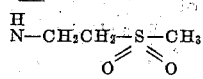

group is obtained. The anthraquinone compounds forming the dye mixture contain no other substituents in addition to those named. This dye mixture colors cellulose acetate silk deep blue shades which are very fast to light.

*Example 10*

24 grams of leuco quinizarin, 150 cc. of butanol, 12.8 grams of β,γ-dihydroxypropylamine and 7.4 grams of β-aminoethylmethylsulfone are refluxed together for four hours following which the resulting leuco dye formed is oxidized by passing air into the hot reaction mixture. Upon working up the reaction mixture, a dye mixture consisting of anthraquinone compounds substituted in the 1 and 4 positions with a mono-β,γ-dihydroxypropylamino group and a

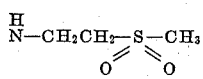

group and in which said groups are present in the ratio of seven moles of the β,γ-dihydroxypropylamino group to three moles of the

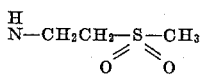

group is obtained. The anthraquinone compounds forming the dye mixture contain no other substituents other than those mentioned. The dye mixture obtained colors cellulose acetate silk deep blue shades.

Other dyes which can be prepared in accordance with the procedure indicated hereinbefore include, for example,

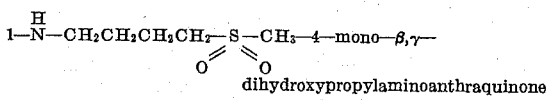
dihydroxypropylaminoanthraquinone

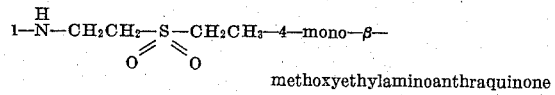
methoxyethylaminoanthraquinone

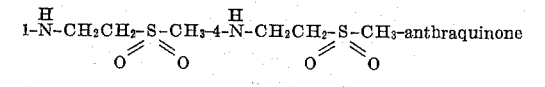-anthraquinone

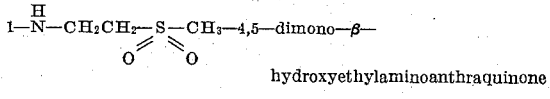
hydroxyethylaminoanthraquinone

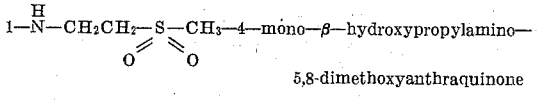
5,8-dimethoxyanthraquinone

Other (alkyl, hydroxyalkyl, alkoxyalkyl) amines which may be used in place of the amines used in the examples include ethylamine, propylamine, butylamine, γ-propanolamine, Δ-butanolamine, amylamine and β-ethoxyethylamine. These amines may be used in conjunction with the aminosulfone and aminosulfoxide compounds to obtain dye compounds of the invention.

The foregoing examples are intended to be illustrative and not limitative of my invention as it will be apparent to those skilled in the art that other compounds included within the scope of the invention can be prepared in accordance with the teachings set forth herein.

In order that the preparation of the anthraquinone compounds described herein may be entirely clear, the preparation of various intermediate compounds used in their manufacture is described or indicated hereinafter.

*Preparation of β-aminoethylmethylsulfone, β-aminoethylmethylsulfoxide, β-aminoethyl ethylsulfone and β-aminoethyl ethylsulfoxide*

These compounds can be prepared as described at pages 337–347, inclusive, vol. 386 of Liebig's Annalen.

*Preparation of γ-aminopropylmethylsulfoxide*

This compound is described at page 343, vol. 388 of Liebig's Annalen.

*Preparation of γ-aminopropylmethylsulfone*

This compound is described in Berichte der Deutschen Chemischen Gesellschaft, vol. 41, page 4468 and vol. 42, page 3419.

Intermediate compounds which can be employed in the preparation of dye compounds of my invention can also be prepared by treating with ammonia compounds having the formula:

wherein $R_3$ stands for an aliphatic group, X stands for

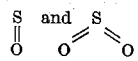

and $R_4$ stands for hydrogen or an aliphatic hydrocarbon group. Similarly, if $R_3$ in the above formula is replaced by —CH=CH—$R_4$ mono- or di-amine compounds can be obtained. The above reactions are illustrated by the following equations.

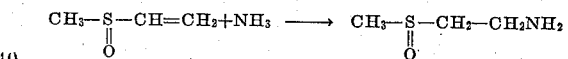

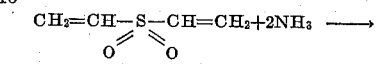

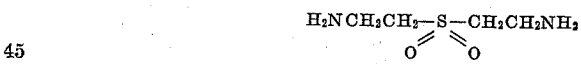

The nuclear non-sulfonated dye compounds of my invention can be employed for the coloration of organic derivatives of cellulose and especially cellulose acetate silk by the well known dispersion methods for applying water-insoluble or substantially water-insoluble dyes to such materials. This general process, together with the proportions of dye and material to be used is described in McNally and Dickey U. S. Patent No. 2,115,030, issued April 26, 1938. This same general method can be employed to apply the nuclear non-sulfonated dye compounds to wool and silk. The nuclear sulfonated dye compounds can be employed to dye wool and silk in accordance with the methods well known to the wool and silk dyeing art.

I claim:

1. The anthraquinone dye compounds having the formula

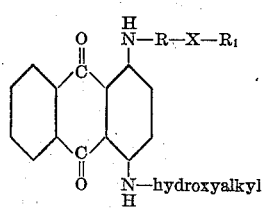

wherein R stand for an aliphatic hydrocarbon radical, X stands for a member selected from the group consisting of

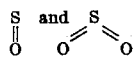

and $R_1$ stands for an aliphatic group.

2. The anthraquinone dye compounds having the formula

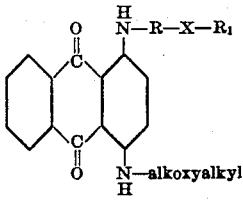

wherein R stands for an aliphatic hydrocarbon radical, X stands for a member selected from the group consisting of

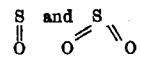

and $R_1$ stands for an aliphatic group.

3. The anthraquinone compound of the following formula:

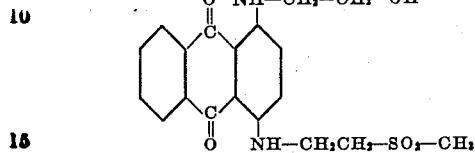

JOSEPH B. DICKEY.